(12) United States Patent
Meador et al.

(10) Patent No.: US 6,661,631 B1
(45) Date of Patent: Dec. 9, 2003

(54) AUTOMATIC LATCHUP RECOVERY CIRCUIT FOR FINGERPRINT SENSOR

(75) Inventors: James Chester Meador, Berkeley, CA (US); Giovanni Gozzini, Berkeley, CA (US); Marco Sabatini, Kensington, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 145 days.

(21) Appl. No.: 09/658,540

(22) Filed: Sep. 9, 2000

(51) Int. Cl.⁷ .................................................. H02H 9/02
(52) U.S. Cl. ........................................ 361/93.1; 382/124
(58) Field of Search ............................. 361/91.3, 93.1, 361/93.9; 382/124

(56) References Cited

U.S. PATENT DOCUMENTS

| | | | | |
|---|---|---|---|---|
| 5,319,515 A | * | 6/1994 | Pryor et al. ..................... | 361/93 |
| 5,903,225 A | * | 5/1999 | Schmitt et al. ........ | 340/825.31 |
| 5,923,830 A | * | 7/1999 | Fuchs et al. ........... | 395/182.09 |
| 5,940,526 A | * | 8/1999 | Setlak et al. ................. | 382/124 |
| 6,064,555 A | * | 5/2000 | Czaikowski et al. ........ | 361/111 |
| 6,141,770 A | * | 10/2000 | Fuchs et al. ................... | 714/11 |
| 6,246,566 B1 | * | 9/2001 | Glenn ......................... | 361/220 |

* cited by examiner

Primary Examiner—Gregory J. Toatley, Jr.
Assistant Examiner—Z Kitov
(74) Attorney, Agent, or Firm—Lisa K. Jorgenson; William A. Munck

(57) ABSTRACT

Current drawn by the fingerprint sensor subject to electrostatic discharge events not fully dissipated by a pad ring is monitored. Upon detection of an overcurrent (e.g., an increase in the current drawn by approximately an order of magnitude) indicating that a latchup condition has occurred, power is removed from the sensor, together with all inputs to the sensor, until the latchup condition is cleared. If a processor or controller is employed by the sensor, the processor or controller is concurrently reset since a firmware crash may be induced by the latchup condition. If a parallel port or other communications connection is employed by the sensor, the overcurrent signal is employed to directly disconnect power and input signals to the sensor.

20 Claims, 3 Drawing Sheets

AUTOMATIC LATCHUP RECOVERY CIRCUIT FOR FINGERPRINT SENSOR

BACKGROUND OF THE INVENTION

1. Field of the Invention

The present invention relates to power control systems for integrated circuits and in particular to prevention of electrostatic discharge damage to integrated circuits without a pad ring.

2. Description of the Prior Art

In conventional integrated circuits, electrostatic discharge (ESD) events typically enter the circuitry through the pad ring, which dissipates the charge before reaching the core. Some recently developed integrated circuits, however, must necessarily expose the core of the circuitry to ESD events. Fingerprint sensors, for example, usually contain a two-dimensional array of sensing electrodes proximate to a sensing surface on which the finger is placed, where the sensing electrodes are closely connected to the core circuitry controlling acquisition of a fingerprint image. The exposure to electrostatic discharge events resulting from a finger touching the sensing surface is necessitated by the need for contact with the finger in order to detect fingerprint features. For this reason, integrated circuit fingerprint sensors are subject to entering a latchup condition (caused by an ESD event or other disturbance), during which excessive power flows and the sensor may be damaged or the user burned.

Where the fingerprint sensor is connected to another device, such as a processor or other controller, the same ESD event which causes the fingerprint sensor to enter a latchup condition may cause the connected device to malfunction (e.g., cause the processor/controller to crash). In many cases, the processor or controller may not be configured to automatically recover from such malfunctions. Moreover, some connectivity architectures, such as the Universal Serial Bus (USB) architecture, require a processor to control data communications between a peripheral input/output (I/O) device and a host system. While peripherals are automatically detected and initialized by the host system when first physically connected to a USB port, detection of a malfunction within the peripheral by the host system and recovery from the malfunction through reinitialization are usually not automatic. Instead, either physical disconnection of the peripheral from the USB port followed by reconnection or manual rebooting of the host system may be required to recover from the malfunction.

It would be desirable, therefore, to protect both the fingerprint sensor and the user from possible consequences of an ESD event and/or a latchup condition and to automatically recover from the occurrence of such an event or condition.

SUMMARY OF THE INVENTION

Current drawn by the fingerprint sensor subject to electrostatic discharge events not fully dissipated by a pad ring is monitored. Upon detection of an overcurrent (e.g., an increase in the current drawn by approximately an order of magnitude) indicating that a latchup condition has occurred, power is removed from the sensor, together with all inputs to the sensor, until the latchup condition is cleared. If a processor or controller is employed by the sensor, the processor or controller is concurrently reset since a firmware crash may be induced by the latchup condition. If a parallel port or other communications connection is employed by the sensor, the overcurrent signal is employed to directly disconnect power and input signals to the sensor.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

The following description details the structure, application and features of the present invention, but it will be understood by those of skill in the art that the scope of the invention is defined only by the issued claims, and not by any description herein.

Figure 1A:
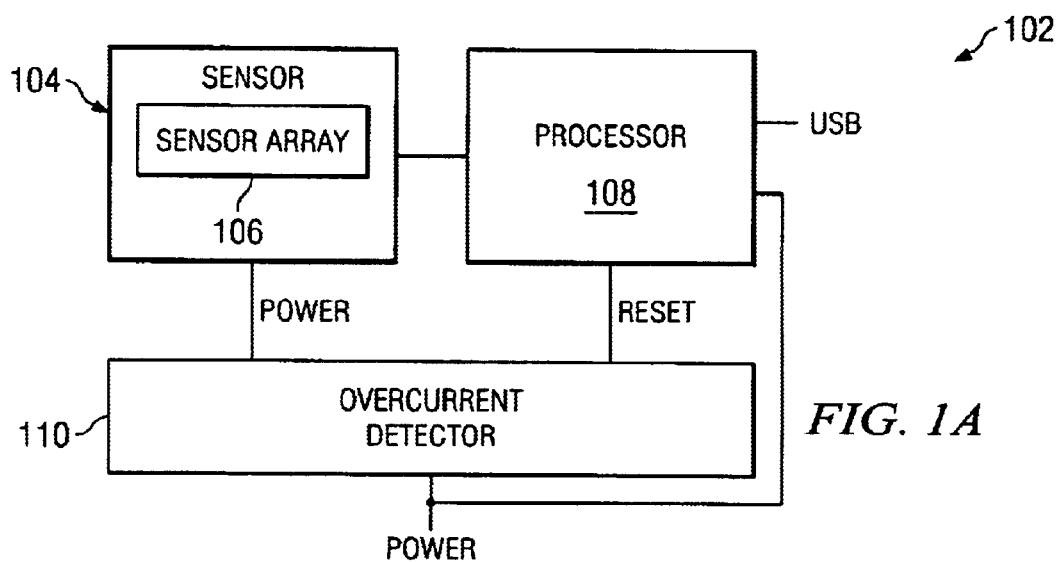
FIGS. 1A–1B depict fingerprint sensors employing automatic latchup recovery in accordance with a preferred embodiment of the present invention.
Figure 1B:
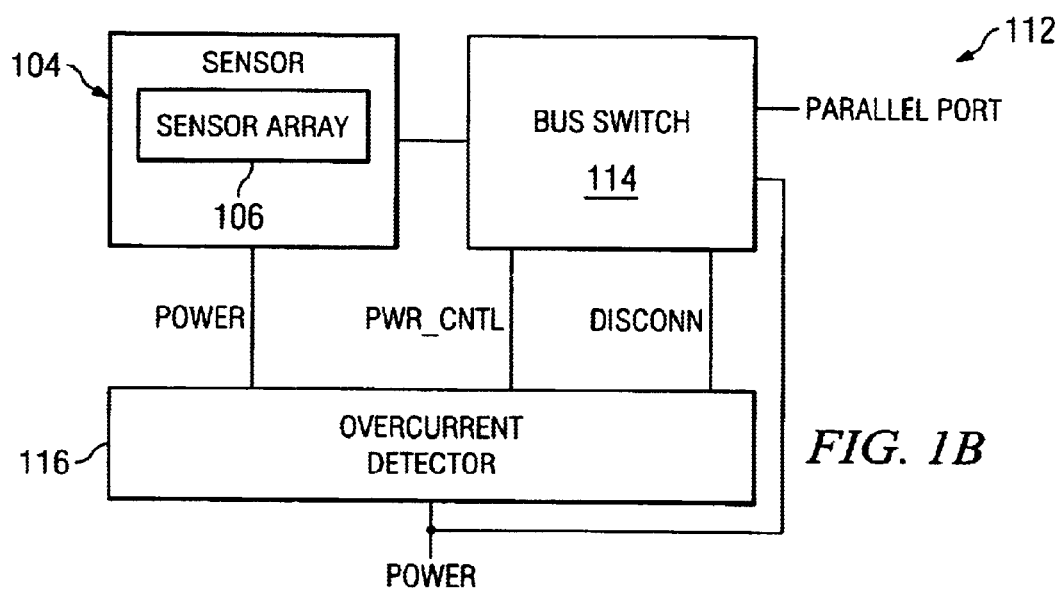

With reference now to the figures, and in particular with reference to FIGS. 1A and 1B, fingerprint sensors employing automatic latchup recovery in accordance with a preferred embodiment of the present invention are depicted. The integrated circuits, discrete devices, and interconnections depicted in these and subsequent drawings may be mounted and/or formed on a printed circuit board with appropriate connectors (e.g., cable port, edge connector, or pins) to provide a complete fingerprint sensor device adapted for connection to a host system.

FIG. 1A depicts a block diagram of the fingerprint sensor peripheral device 102 including a processor, such as a fingerprint sensor peripheral designed for connection to a Universal Serial Bus (USB) port within a host system (not shown). Fingerprint sensor peripheral device 102 includes a sensor circuit 104 having a sensor array 106, a two-dimensional array of sensing electrodes positioned proximate to a sensing surface on which a finger is placed for acquisition of the fingerprint. Sensor circuit 104 also includes circuits for scanning the sensing electrode array and processing the measurements from each electrode to generate pixel data for a fingerprint image. Sensor circuit 104 is accordingly subject to electrostatic discharge (ESD) events which are not fully dissipated by any pad ring within the circuit's packaging and which may induce a latchup condition.

Sensor circuit 104 in the example of FIG. 1A is connected to a processor 108 providing an interface for sensor circuit 104 to a USB connector (not shown), which may be connected in turn to a USB cable and, through the cable, to a USB port within the host system. An overcurrent detector 110 connected in series between sensor circuit 104 and a power input to fingerprint sensor peripheral device 102 includes a signal line connected to a reset input for processor 108. Overcurrent detector 110 triggers automatic latchup recovery for fingerprint sensor peripheral device 102 as described in greater detail below.

Figure 2A:
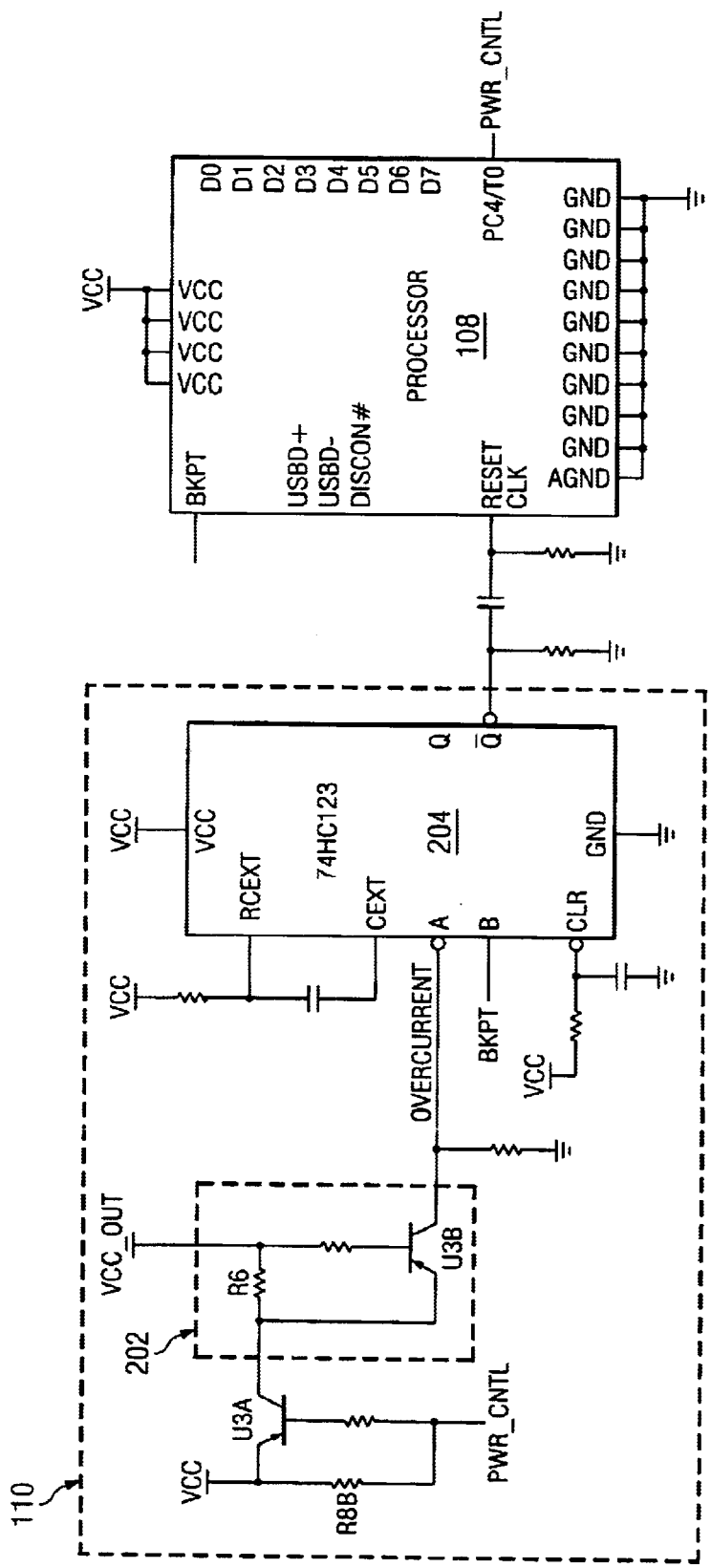
FIGS. 2A–2B are circuit diagrams for latchup detection and recovery mechanisms in accordance with a preferred embodiment of the present invention.

Referring to FIG. 2A, which is intended to be read in conjunction with FIG. 1A, a circuit diagram for an overcurrent detector triggering automatic latchup recovery within a fingerprint sensor peripheral device in accordance with a preferred embodiment of the present invention is illustrated. Overcurrent detector 110 includes a current sensing mechanism 202 connected in series between the power input VCC to fingerprint sensor peripheral device 102 and the power input connection for sensor circuit 104, connected to power output $VCC_{13}$ OUT. In the exemplary embodiment, the current drawn by sensor circuit 104 from power input VCC through the power output VCC_OUT of overcurrent detector 110 is sensed utilizing a sense resistor R6. If the voltage drop across resistor R6 exceeds a predetermined threshold, sensor circuit 104 is presumed to be in a latchup condition. The threshold is selected to detect increases in current flow by approximately an order of magnitude above typical currents.

In the example of FIG. 2A, the threshold voltage above which sensor circuit 104 is assumed to be in latchup is determined by the turn-on voltage (0.7 V) of a PNP bipolar junction transistor (BJT) U3B. Current flow which results in a voltage drop across sense resistor R6 in excess of the threshold voltage/turn-on voltage for transistor U3B causes the output signal OVERCURRENT of transistor U3B to go high, triggering shutdown of power to sensor circuit 104 and a reset of processor 108. Transistor output signal OVERCURRENT is connected to an input of a one-shot (pulsed output flip-flop, such as a 74HC123) 204. In the exemplary embodiment, overcurrent signal OVERCURRENT is inverted at the input to one-shot 204, and the inverted output of one-shot 204 is connected to a reset input for processor 108.

One-shot 204 in the example shown also serves as a watchdog for processor 108. The other input to one-shot 204 is connected to a processor output BKPT which is asserted at regular intervals when the firmware is executing properly within processor 108. The BKPT input to one-shot 204 prevents the one-shot 204 from timing out. Thus, either a latchup condition in sensor circuit 104 or a firmware failure within processor 108 causes the one-shot 204 to time out, and processor 108 is reset.

Overcurrent detector 110 also disconnects the power to sensor circuit 104 when a latchup condition is detected. A transistor U3A is connected in series with sense resistor R6 between the power input VCC and the power output VCC_OUT to sensor circuit 104. Transistor U3A is controlled by a programmable output PC4/T0 of processor 108, which generates a sensor circuit power control signal PWR_CNTL. During normal operation, power control signal PWR_CNTL maintains transistor U3A in a conductive state. During a reset of processor 108, however, power control signal PWR_CNTL is shut off, which also shuts off transistor U3A. Once the processor 108 has recovered from the crash and/or reinitialized, power control signal PWR_CNTL is reasserted by processor output PC4/T0 and transistor U3A is again switched on, allowing sensor circuit 104 to once again draw power.

FIG. 1B depicts a block diagram of the fingerprint sensor device 112 which does not include a processor. In addition to sensor circuit 104 with sensor array 106, fingerprint sensor device 112 includes a communications connector 114, which is a programmable bus switch for a parallel port connection in the embodiment depicted. As in the embodiment of FIGS. 1A and 2A, an overcurrent detector 116 is connected in series between sensor circuit 104 and a power input to fingerprint sensor device 112, and triggers automatic latchup recovery for fingerprint sensor device 112.

Figure 2B:
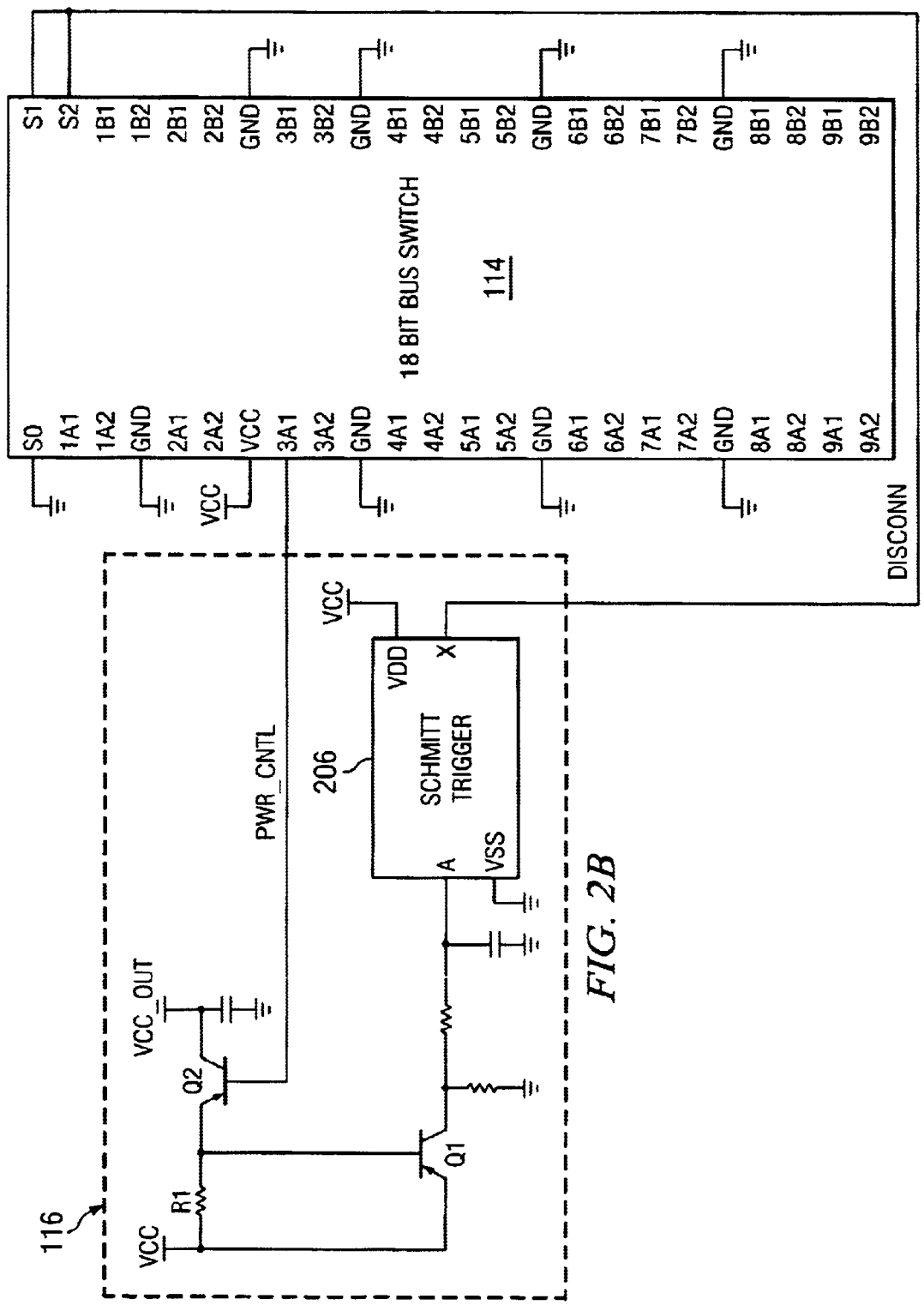

FIG. 2B, which is intended to be read in conjunction with FIG. 1B, is a circuit diagram for overcurrent detector 116 triggering automatic latchup recovery within a fingerprint sensor device. As with the embodiment described above, over-current detector 116 also includes a resistive current sensing mechanism, sense resistor R1. In this embodiment, however, the latchup signal is employed directly to disconnect the sensor from the power, and all inputs are removed.

A voltage drop across resistor R1 in excess of the turn on voltage for transistor Q1, which constitutes an overcurrent indicating a latchup condition has occurred, causes transistor Q1 to switch on to a conductive state. The output of transistor Q1 is coupled to the input of a Schmitt trigger 206. The output of Schmitt trigger 206 is connected to one or more shut-down/turn-on inputs to bus switch 114. When an overcurrent is detected, bus switch 114 is shut down to remove all data inputs to sensor circuit 104 (even in the absence of a power supply, a latchup condition may be maintained through the input signals). Once the overcurrent condition terminates, the output DISCONN of Schmitt trigger 206 turns bus switch 114 back on.

Overcurrent detector 116 also includes a transistor Q2 connected in series with sense resistor R1 between the power input VCC to the fingerprint sensor device and the power output VCC_OUT connected to the power input of the sensor circuit 104. The operation of transistor Q2 is controlled by a programmable output 3A1 of bus switch 114, connected by a signal PWR_CNTL to transistor Q2. When bus switch 114 is operational, transistor Q2 is maintained in a conductive state, allowing power to be transmitted to sensor circuit 104. When bus switch 114 is shut down, however, transistor Q2 switches off and removes power from sensor circuit 114 until bus switch 114 is turned back on.

The present invention provides automatic latchup recovery for circuits in which ESD events are not fully dissipated by a pad ring, such as fingerprint sensors. Current drawn by the fingerprint sensor is monitored and, upon occurrence of an overcurrent condition indicating a latchup condition, power is removed from the sensor together with all inputs to the sensor so that the latchup condition is cleared. Burning of a user's finger is avoided, and recovery from the latchup condition without user intervention is enabled. In the case where a controller or processor is employed in conjunction with the fingerprint sensor, a watchdog output may also be monitored so that the firmware may be reset with or without an accompanying latchup condition in the sensor.

While the invention has been particularly shown and described with reference to a preferred embodiment, it will be understood by those skilled in the art that various changes in form and detail may be made therein without departing from the spirit and scope of the invention.

What is claimed is:

1. A method of automatically recovering from a latchup condition, comprising:
    monitoring a current drawn by a fingerprint sensor; and
    responsive to detecting an increase in the current drawn by the fingerprint sensor which indicates that a latchup condition has occurred:
        disconnecting inputs to the fingerprint sensor at a controller coupled to the fingerprint sensor, and
        removing power to the fingerprint sensor.

2. method of claim 1, further comprising:
    after a period of time following disconnection of the inputs to the fingerprint sensor and removal of power from the fingerprint sensor, automatically reconnecting the input to the fingerprint sensor and restoring power to the fingerprint sensor.

3. The method of claim 1, wherein the step of monitoring a current drawn by a fingerprint sensor further comprises:

connecting a resistor in series with a power input to the fingerprint sensor; and connecting a transistor across the resistor, wherein a voltage drop across the resistor in excess of a turn-on voltage for the transistor generates an overcurrent signal.

4. The method of claim 3, further comprising:

connecting the overcurrent signal to a reset input for a processor coupled to the fingerprint sensor.

5. The method of claim 4, further comprising:

connecting a programmable output of the processor to a second transistor connected in series with the power input to the fingerprint sensor, wherein the programmable output maintains the second transistor in a conductive state while the processor is operational and switches off the second transistor when the processor is reinitializing after being reset.

6. The method of claim 3, further comprising:

employing the overcurrent signal to shut-down a bus switch coupled to the fingerprint sensor, wherein the bus switch shuts down when the overcurrent signal is asserted and the bus switch turns on when the overcurrent signal not asserted.

7. The method of claim 6, further comprising:

connecting a programmable output of the bus switch to a second transistor connected in series with the power input to the fingerprint sensor, wherein the programmable output maintains the second transistor in a conductive state while the bus switch is operational and switches off the second transistor when the bus switch is shut down.

8. An automatic latchup recovery mechanism, comprising:

a fingerprint sensor;

an overcurrent detector connected in series with a power input for the fingerprint sensor; and a controller coupled to the fingerprint sensor, wherein the overcurrent detector, responsive to detecting a current in excess of a predetermined threshold being drawn by the fingerprint sensor, causes the controller to disconnect all inputs to the fingerprint sensor and to remove power from the fingerprint sensor.

9. The automatic latchup recovery mechanism of claim 8, wherein the overcurrent detector or the controller, after a period of time has elapsed since the inputs to the fingerprint sensor were disconnected and the power was removed from the fingerprint sensor, reconnects the inputs to the fingerprint sensor and restores power to the fingerprint sensor.

10. The automatic latchup recovery mechanism of claim 8, wherein the overcurrent detector further comprises:

a resistor connected in series with the power input for the fingerprint sensor; and a transistor connected across the resistor, wherein a voltage drop across the resistor in excess of a turn-on voltage for the transistor causes the transistor to generate an overcurrent signal.

11. The automatic latchup recovery mechanism of claim 8, wherein the controller further comprises:

a processor having a reset input receiving an overcurrent signal generated by the overcurrent detector and a programmable output controlling a transistor connected in series with the power input of the fingerprint sensor, wherein the programmable output maintains the transistor in a conductive state while the processor is operational and switches off the transistor while the processor is reinitializing after being reset.

12. The automatic latchup recovery mechanism of claim 8, wherein the controller further comprises:

a Schmitt trigger receiving an overcurrent signal from the overcurrent detector; and a bus switch having:

a shut-down input coupled to an output of the Schmitt trigger, wherein the Schmitt trigger shuts down the bus switch when the overcurrent signal is asserted and subsequently turns on the bus switch when the overcurrent signal is no longer asserted, and a programmable output controlling a transistor connected in series with the power input of the fingerprint sensor, wherein the programmable output maintains the transistor in a conductive state while the bus switch is turned on and switches off the transistor when the bus switch is turned off.

13. A fingerprint sensor device having automatic latchup recovery, comprising:

a fingerprint sensor having a power input;

a resistor connected at a first end to a power input for the fingerprint sensor device and at a second end to a first terminal of a first transistor, wherein a second terminal of the first transistor is connected to the power input for the fingerprint sensor;

a second transistor connected at a first terminal to the first end of the resistor and connected at a second terminal to the second end of the resistor, wherein a voltage drop across the resistor in excess of a predetermined threshold causes the transistor to conduct, thereby generating an overcurrent signal at a third terminal of the transistor; and a controller receiving a control signal corresponding to a state change in the overcurrent signal, the controller disconnecting inputs to the fingerprint sensor and removing power from the fingerprint sensor when the control signal is asserted.

14. The fingerprint sensor device of claim 13, wherein the controller further comprises:

a processor receiving the control signal at a reset input.

15. The fingerprint sensor device of claim 14, wherein the processor includes a programmable output coupled to a third terminal of the first transistor, the programmable output maintaining the first transistor in a conductive state while the processor is operational and shutting the first transistor off when the processor is reinitializing after being reset.

16. The fingerprint sensor device of claim 14, further comprising:

a one-shot receiving the overcurrent signal and generating the control signal connected to the reset input of the processor, wherein the one-shot asserts the control signal in response to the overcurrent signal being asserted, thereby resetting the processor.

17. The fingerprint sensor device of claim 13, wherein the controller further comprises:

a bus switch receiving the control signal at a shut-down input.

18. The fingerprint sensor device of claim 17, wherein the bus switch includes a programmable output coupled to a third terminal of the first transistor, the programmable output maintaining the first transistor in a conductive state while the bus switch is turned on and shutting the first transistor off when the bus switch is shut down.

19. The fingerprint sensor device of claim 17, further comprising:

a Schmitt trigger receiving the overcurrent signal and generating the control signal connected to the shut-down input of the bus switch, wherein the Schmitt trigger asserts the control signal when the overcurrent signal is asserted to shut down the bus switch and subsequently deasserts the control signal when the overcurrent signal is no longer asserted to automatically turn the bus switch back on.

20. The fingerprint sensor device of claim 13, wherein the first and second transistors are bipolar junction transistors.

* * * * *